US007805002B2

(12) United States Patent
Privalov

(10) Patent No.: US 7,805,002 B2
(45) Date of Patent: Sep. 28, 2010

(54) SMOKE DETECTION METHOD AND APPARATUS

(75) Inventor: George Privalov, Baltimore, MD (US)

(73) Assignee: Axonx Fike Corporation, Blue Springs, MO (US)

( * ) Notice: Subject to any disclaimer, the term of this patent is extended or adjusted under 35 U.S.C. 154(b) by 829 days.

(21) Appl. No.: 10/983,791

(22) Filed: Nov. 8, 2004

(65) Prior Publication Data

US 2005/0100193 A1 May 12, 2005

Related U.S. Application Data

(60) Provisional application No. 60/518,482, filed on Nov. 7, 2003.

(51) Int. Cl.
*G06K 9/00* (2006.01)
*H04N 9/47* (2006.01)
*H04N 7/18* (2006.01)
*G01N 21/00* (2006.01)

(52) U.S. Cl. ........................ 382/170; 382/103; 348/82; 356/436

(58) Field of Classification Search ................. 382/100, 382/103, 106, 168, 170, 171, 172; 348/82, 348/83; 356/432, 433, 434, 438
See application file for complete search history.

(56) References Cited

U.S. PATENT DOCUMENTS 3,924,252 A * 12/1975 Duston ........................ 340/630
3,973,852 A 8/1976 Moore et al. ................ 356/207
4,170,264 A 10/1979 Gibson ........................ 169/24
4,875,526 A 10/1989 Latino et al. .................. 169/24
5,065,443 A * 11/1991 Farchmin .................... 382/273
5,153,722 A 10/1992 Goedeke et al. ............. 358/108
5,170,359 A * 12/1992 Sax et al. ...................... 702/73
5,237,308 A * 8/1993 Nakamura .................. 340/588
5,497,144 A * 3/1996 Schappi et al. .............. 340/630
5,510,772 A * 4/1996 Lasenby ..................... 340/578
5,627,514 A * 5/1997 Morita ....................... 340/507

(Continued)

FOREIGN PATENT DOCUMENTS

JP 2003099876 A * 4/2003

OTHER PUBLICATIONS

Machine Translation of JP2003099876 to Okayama et al.*

(Continued)

*Primary Examiner*—Matthew C Bella
*Assistant Examiner*—Anthony MacKowey
(74) *Attorney, Agent, or Firm*—Hovey Williams LLP

(57) ABSTRACT

A smoke detection method and system, which uses the effects of the diffusion of light to identify the presence of smoke in a monitored area, are disclosed. This method comprises the steps of: (1) electronically capturing a sequence of images of a light source in the monitored area, (2) transferring these images into an image buffer, (3) scanning these images to identify the chunks of adjacent pixels with brightness values above a prescribed threshold, (4) maintaining the sequence of such chunks obtained from consecutive images in a cluster stack, (5) analyzing the evolution of the features of each of these cluster over a prescribed period of time to identify the patterns that are caused by particle-induced light diffusion, and (6) issuing a prescribed system response in the event such light diffused patterns are identified.

5 Claims, 4 Drawing Sheets

U.S. PATENT DOCUMENTS

| | | | | | |
|---|---|---|---|---|---|
| 5,719,557 | A | | 2/1998 | Rattman | 340/628 |
| 5,751,209 | A | | 5/1998 | Werner | 340/286.05 |
| 5,815,590 | A | * | 9/1998 | Buttner et al. | 382/103 |
| 5,832,187 | A | | 11/1998 | Pedersen et al. | 395/50 |
| 5,838,242 | A | | 11/1998 | Marsden | 340/628 |
| 5,850,182 | A | | 12/1998 | Schuler | 340/578 |
| 5,926,280 | A | | 7/1999 | Yamagishi et al. | 356/390 |
| 5,995,008 | A | | 11/1999 | King et al. | 340/578 |
| 6,184,792 | B1 | | 2/2001 | Privalov et al. | 340/578 |
| 6,285,291 | B1 | | 9/2001 | Knox et al. | 340/634 |
| 6,389,162 | B2 | * | 5/2002 | Maeda | 382/172 |
| 6,434,254 | B1 | * | 8/2002 | Wixson | 382/103 |
| 6,690,011 | B2 | * | 2/2004 | Watanabe et al. | 250/330 |
| 6,844,818 | B2 | * | 1/2005 | Grech-Cini | 340/628 |
| 6,901,163 | B1 | * | 5/2005 | Pearce et al. | 382/165 |
| 6,937,743 | B2 | * | 8/2005 | Rizzotti et al. | 382/100 |
| 6,954,859 | B1 | * | 10/2005 | Simerly et al. | 726/3 |
| 6,956,485 | B1 | * | 10/2005 | Aird et al. | 340/577 |
| 6,975,225 | B2 | | 12/2005 | Privalov | 340/539.26 |
| 7,256,818 | B2 | * | 8/2007 | Sadok et al. | 348/143 |
| 2002/0186128 | A1 | * | 12/2002 | Amano et al. | 340/522 |
| 2003/0025599 | A1 | * | 2/2003 | Monroe | 340/531 |
| 2003/0038877 | A1 | * | 2/2003 | Pfefferseder et al. | 348/82 |
| 2003/0053671 | A1 | * | 3/2003 | Dewaele et al. | 382/132 |
| 2003/0137593 | A1 | * | 7/2003 | Watanabe et al. | 348/274 |
| 2003/0141980 | A1 | * | 7/2003 | Moore et al. | 340/578 |
| 2003/0146972 | A1 | * | 8/2003 | Morander | 348/46 |
| 2003/0185450 | A1 | * | 10/2003 | Garakani et al. | 382/232 |
| 2003/0190076 | A1 | * | 10/2003 | DeLean | 382/209 |
| 2004/0052409 | A1 | * | 3/2004 | Bansal et al. | 382/128 |
| 2006/0202847 | A1 | * | 9/2006 | Oppelt et al. | 340/630 |
| 2007/0172143 | A1 | * | 7/2007 | Niem et al. | 382/270 |

OTHER PUBLICATIONS

Privalov & Shaykhutdinov, "Machine Vision Delivers Fire Protection", *Vision System Designs*, pp. 31-35, Mar. 2004.

* cited by examiner

START

ACQUIRE THE NEXT IMAGE
EXECUTION FLOW
DATA FLOW
DETERMINE THE THRESHOLDS
SCAN FOR THE BRIGHT SPOTS
FOUND SPOT ?
YES
CHECK FOR OVERLAPPING WITH BRIGHT SPOTS FROM THE STACKS
BRIGHT SPOTS STACK
CREATE NEW ENTRY TO THE STACK
NO
OVERLAP ?
NEXT SPOT
APPEND THE BRIGHT SPOT TO THE STACK
CHECK FOR LONG TERM PROPERTIES
NO
SMOKE CONDITIONS MET ?
YES
ISSUE ALARM

SMOKE DETECTION METHOD AND APPARATUS

CROSS-REFERENCE TO RELATED APPLICATION

This application claims the benefit of Provisional Patent Application No. 60/518,482, filed Nov. 7, 2003 by George Privalov. The teachings of this application are incorporated herein by reference to the extent that they do not conflict with the teaching herein.

BACKGROUND OF THE INVENTION

1. Field of the Invention

The present invention generally relates to electrical, condition responsive systems and methods. More particularly, this invention relates to a method and apparatus for detecting smoke in a monitored area using a sequence of digitized images of the area.

2. Description of the Related Art

Smoke detectors are very important safety devices that can provide an early warning of fire in a monitored area. Considerable efforts have been devoted to improving upon the technology used in smoke detectors as a means of increasing their usefulness and reliability.

One of the most commonly used methodologies for smoke detectors involves measuring the presence of aerosol particles at the location of a smoke detector's sensor. Such measurements are based either on light scattering phenomena or on the effects due to smoke particle interactions with an ionization current created within the detector. See Rattman, et al., U.S. Pat. No. 5,719,557.

A disadvantage of this approach is that its measurements are limited in terms of their sensing area since such detectors monitor for the presence of smoke only at those points that are in close proximity to the location of the detector's sensor. The successful detection of smoke in a monitored area using this technique greatly depends upon the rate of movement of smoke particles toward the detector's sensor which, depending upon the size of the monitored area, can be located a considerable distance from the initial source of any smoke.

To address this insufficient sample size problem, it has been suggested that air samples be collected at multiple locations in the monitored area and then to guide these samples to the location of the detector's sensor. See Knox, et al., U.S. Pat. No. 6,285,291. Although effectively increasing the extent of spatial sampling within a monitored area, this method has the disadvantage of requiring the installation of multiple sampling tubes at assorted locations throughout the monitored area.

Another approach for smoke detection has been to monitor the light scattering effect of smoke particles on a laser beam that is directed across a monitored area. Rather than just sensing smoke in just the relatively small vicinity of a single sensor, the laser beam approach effective senses for smoke along a line that can extended for a considerable distant throughout the monitored area. See Moore, et al., U.S. Pat. No. 3,973,852. However, a disadvantages of using such a laser beam approach is that, although it may effectively measure smoke conditions at more points within a monitored area that just those points in the vicinity of a single sensor, it still does not provided feedback on the smoke conditions at all or most of the points within the monitored area.

Despite the considerable prior art relating to smoke detectors, there is still a need for smoke detector methods and systems that can more effectively measure smoke conditions throughout the entire volume of a desired monitored area.

OBJECTS AND ADVANTAGES

There has been summarized above, rather broadly, the prior art that is related to the present invention in order that the context of the present invention may be better understood and appreciated. In this regard, it is instructive to also consider the objects and advantages of the present invention.

It is an object of the present invention to provide apparatus and methods that are effective at detecting smoke within the entire volume of a monitored area.

It is another object of the present invention to provide apparatus and methods that are effective at detecting smoke in industrial petrochemical installations.

It is an object of the present invention to provide apparatus and methods that can operate within the framework of the ordinary Closed Circuit Television (CCTV) surveillance systems that are used to monitor commercial, outdoor, industrial and residential areas It is yet another object of the present invention to demonstrate how existing security surveillance equipment may be combined into unique systems which provide the best means to address the detection of smoke in industrial, commercial and residential installations.

Is it is a further object of the present invention to provide a means for providing notification of smoky conditions within a monitored area to remote operators who are using closed circuit television to monitor the area.

These and other objects and advantages of the present invention will become readily apparent as the invention is better understood by reference to the accompanying summary, drawings and the detailed description that follows.

SUMMARY OF THE INVENTION

Recognizing the need for the development of improved smoke detection systems and methods, the present invention is generally directed to satisfying the needs set forth above and overcoming the disadvantages identified with prior art devices and methods.

In accordance with the present invention, the foregoing need can be satisfied by providing an early smoke detection means that can operate within the framework of the ordinary Closed Circuit Television (CCTV) surveillance system for commercial, outdoor, industrial and residential installation. In a preferred embodiment, the present invention monitors the images being collected from a light source in the monitored area and looks for changes in these images to identify the presence of smoke in any part of the path between the light source and the camera. The present invention includes: (a) a means for capturing the digital images from a light source in the monitored remote area and transmitting them into a frame buffer, (b) a means of analyzing these images to identify the clusters of pixels that have brightness levels higher than a prescribed threshold level, (c) a means of maintaining the database of these clusters obtained over a prescribed period of time, (d) a means of analyzing these clusters over a prescribed period to identify any evolving patterns which are consistent with the presence of smoke or fog, and (e) a means of issuing and delivering an alert notification to responsible parties including, but not limited to live video images from the location when the presence of smoke has been identified.

Thus, there has been summarized above, rather broadly, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Figure 1:
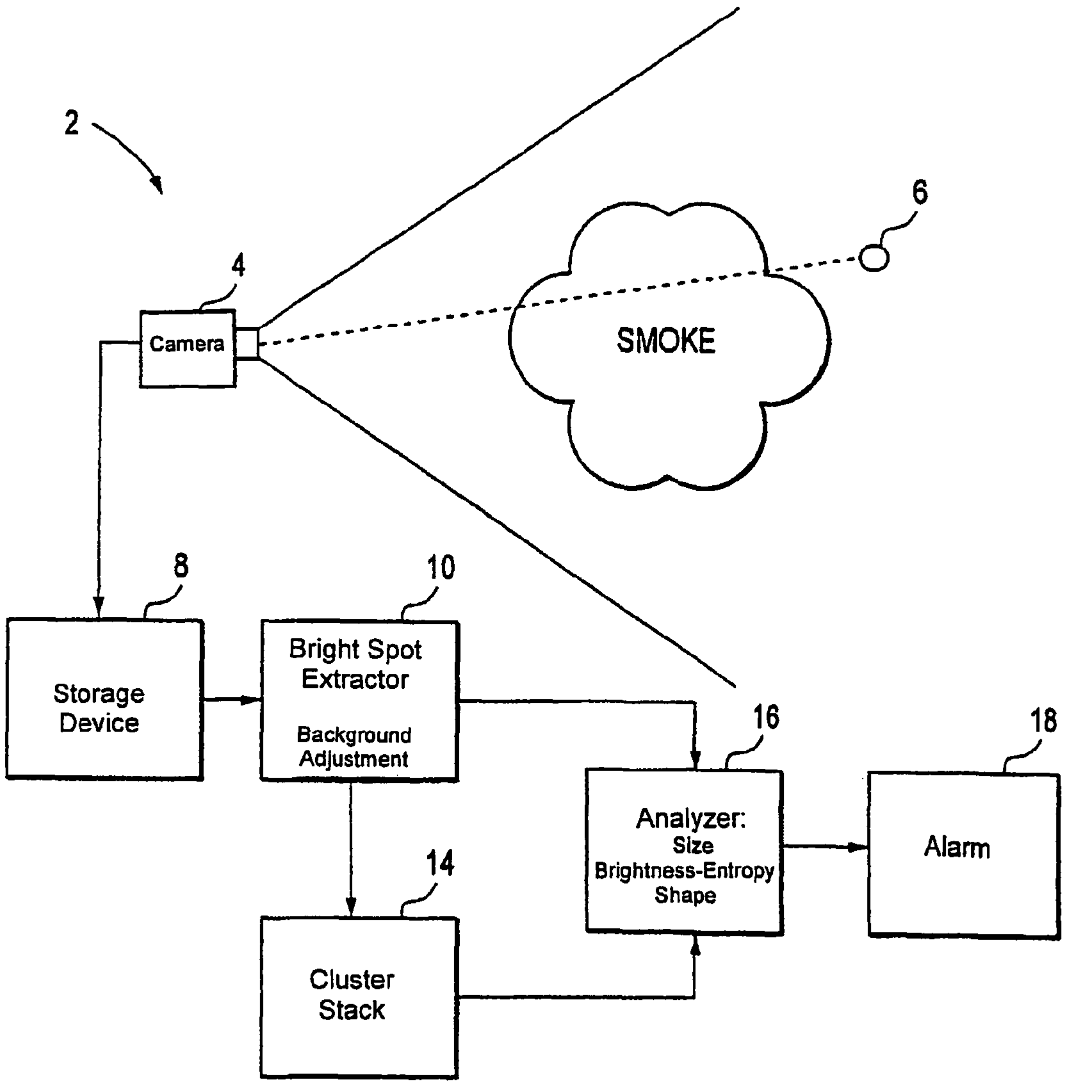
FIG. 1 shows a block diagram of a preferred embodiment of the smoke detection method and apparatus of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

FIG. 1 shows a preferred embodiment of the smoke detection method and apparatus of the present invention. The smoke detection system 2 includes: at least one digital video camera 4 with a field of view that includes but is not limited to at least one stable light source 6, such as a light fixture, illuminated emergency exit or other sign, or light source installed specifically for the purpose of providing the diffusion effect for detecting smoke.

The digital video camera 4 provides a means for detecting and capturing, at a prescribed frequency (e.g., 16 frames per second) and spatial resolution (e.g., 160×120 pixels), video frames or bitmap images of an area that is to be temporally monitored for the presence of smoke. See FIG. 3.

In the event of smoke, the cloud of aerosol particles accumulating within the observed area will have a diffusion effect on the light from the light source 6 when it travels towards the camera 4 affecting the image or bitmap of the light source. The effect of this diffusion on the image can be identified using prescribed imaging techniques and is subject of the present invention.

The sequence of digitized images acquired by the television camera 4 are placed in a storage device or frame buffer 8 for further analysis, with the buffer serving as a means for cyclically accumulating a sequential set of said captured bitmaps for analysis. The step utilizes a means 10 for providing for the extraction of the bright spot areas of the image in the form of pixel regions, and a means for arranging overlapping pixel regions gathered from frames collected at consecutive instances in a sequential collection, which I denote as a bright spot cluster stack 14.

Such stacks 14 are maintained for each non-overlapping bright spot in the image and are constantly monitored by an analyzer 16 for the anomalies that, with certain degree of confidence, are caused by the smoke-induced scattering of light. In the event of such anomalies, a means 18 for providing an alert notification is used to issue such a notification to invoke the proper system response that may include, but is not limited to, issuing light and/or sound alarms, notifying a remote operator by means of messages sent over assorted transmission lines, existing computer network architecture, and other communication devices. Alert notification may also include a live video image being transmitted from the monitored location.

Figure 2:
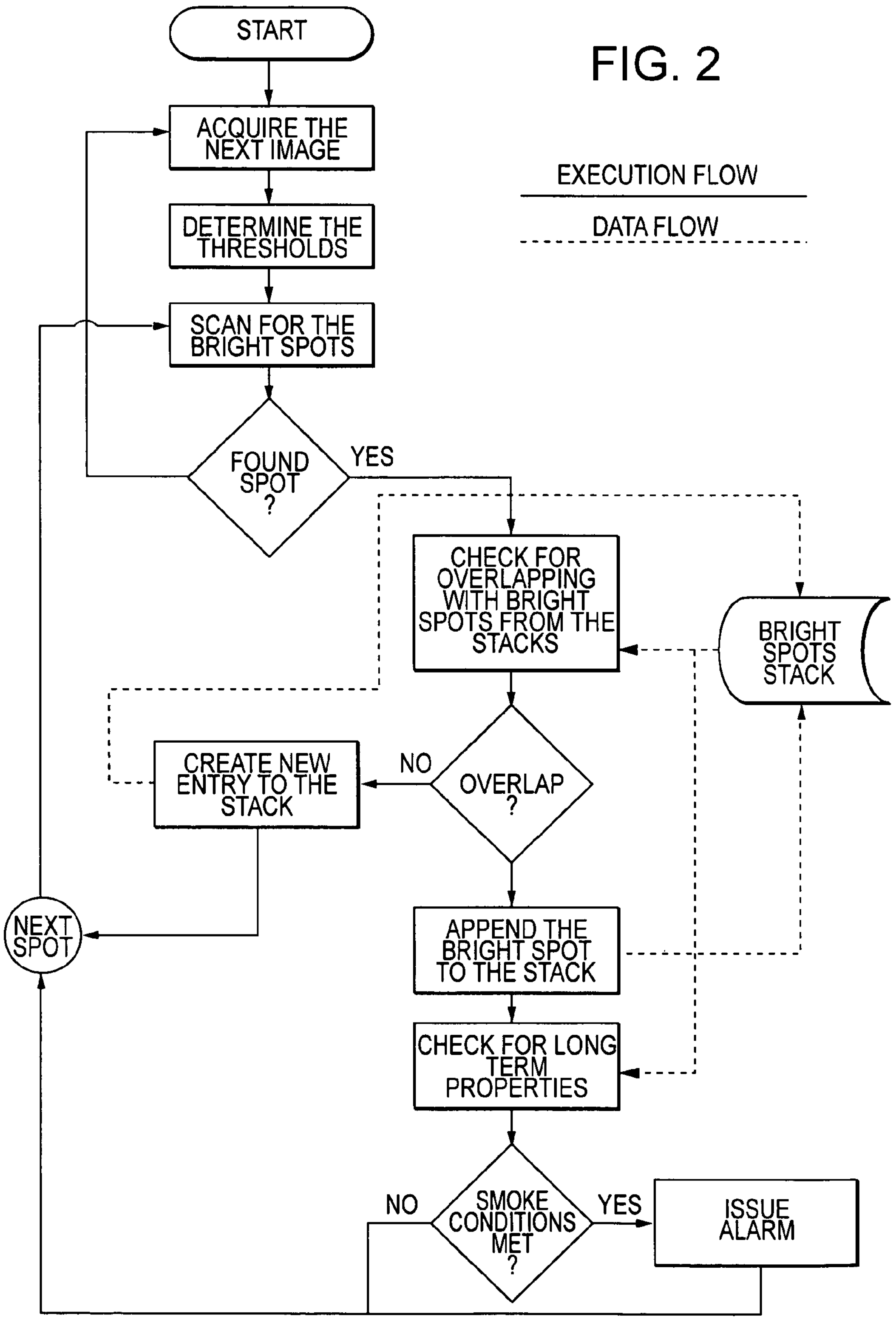
FIG. 2 shows the algorithm for a preferred embodiment of the smoke detection method and apparatus of the present invention.

FIG. 2 shows an operating flowchart of a preferred algorithm that implements a preferred embodiment of the smoke detection method and apparatus of the present invention. It comprises of the following steps: the starting point that includes the initiation of hardware and the data structures necessary for further steps, the image or frame acquisition step that may include but is not limited to gathering a digitized frame and digital filtering to reduce the noise in such an image. The appropriate thresholds for bright spot identification are determined at the next step that may include, but is not limited to statistical analysis of the sequence of images gathered over a prescribed period of time. This bright spot threshold determination step may also include a dynamic adjustment for the temporal changes in the background brightness conditions within the monitored area. Further, the image is scanned to determine the pixels that are qualified as bright spots where the brightness level of the pixel is higher than the threshold determined at the prior threshold determination step and are static, i.e., these bright spots were present at the location over prescribed period of time, so the moving light sources will be excluded.

If such pixels are present, the adjacent pixels that fall into this category are grouped into the isolated clusters, further referred to as spots, where each of such spots is verified for overlapping with the spots gathered at the previous frames and stored in the bright spots stack. In case of the overlap, the relevant entry in the bright spot stack is appended with the new instance of the cluster or spot determined at the last frame. Otherwise, the new entry in the bright spot stack is created with only one instance.

Once the entry has more then prescribed number of instances, the determination is made of whether the cluster or spot may indicate the presence of smoke.

This decision is made based on evolution of one of a number of possible properties of the images or bitmaps, such as: variations in their area as a function of time, the statistical distribution of their brightness values, a computation of what is denoted as their Shannon entropy or the movement of the light source which generates such images. In case of a positive identification for the presence of smoke, the relevant alarms are issued.

Figure 3:
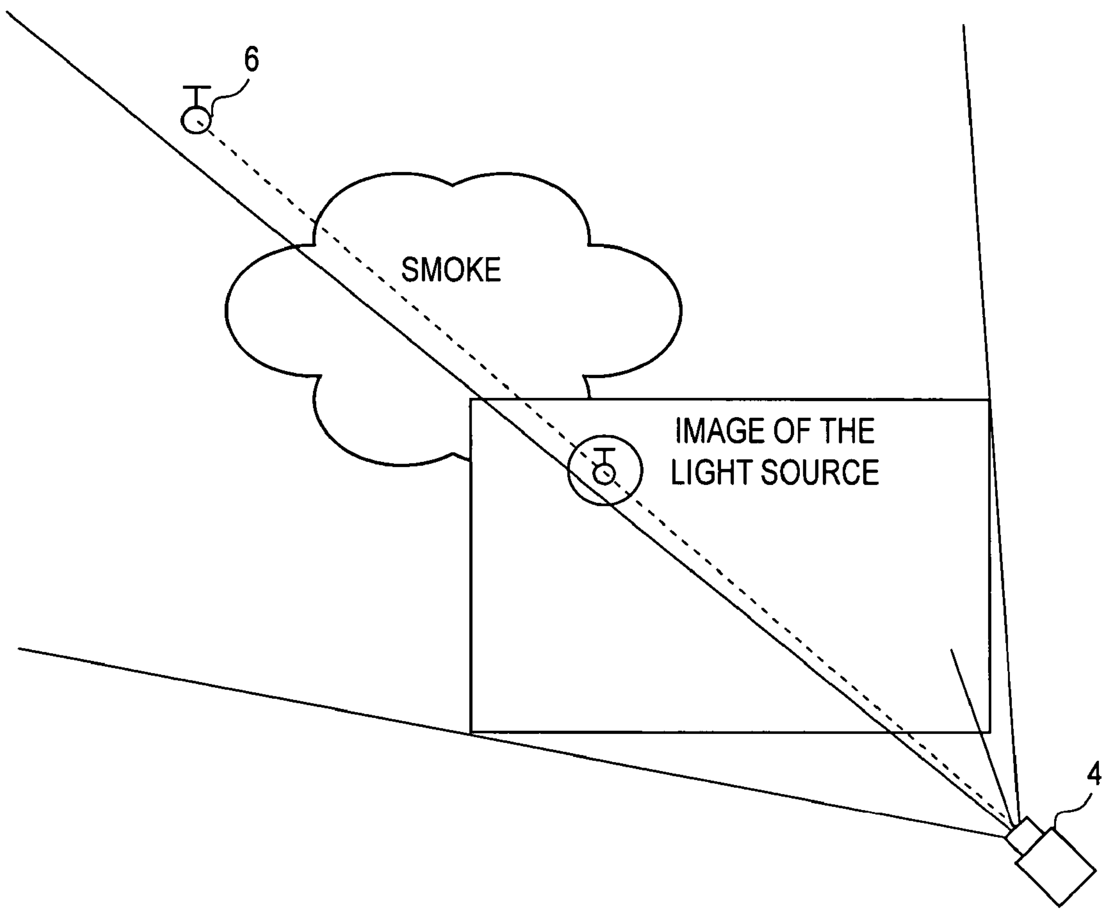
FIG. 3 illustrates the effect of the light source diffusion caused by smoke.

FIG. 3 illustrates the effect of smoke on the image of a light source. The light from the source 6 is diffused by the smoke on its way to the camera 4 where it forms the image of the light source on the camera's lens or sensor. Normally the image is small with sharp edges. The size of the bright spot reflects the distance and size of the light source. The brightness value across this image is uniform.

In case of diffusion of light caused by the presence of smoke between the light source and the camera, the overall area of the bright spot will expand while the brightness values will become more diverse and gradually decaying from the center of the spot.

Successful identification of smoke conditions with the present invention depends on the analysis of the evolving patterns of various parameters of such clusters or spots gathered over a period of time. Various ways that the present invention provides for analyzing these spots include:

Evolution of the Spot's Size of Area

In the first approximation, the degree of the light diffusion caused by smoke is proportional to the concentration of smoke, the length of travel between light source and the camera, and the size and reflective properties of smoke particles. In the event of fire, smoke is being produced at a certain rate and gradually builds up in the monitored space. That results in a gradual increase in overall concentration of the smoke over the light's path of travel to the camera. That in turn will induce a gradual increase in the size and the area of the monitored bright spots.

Therefore, one of the criteria for the existence of or identification of a smoke condition in the monitored area is a steady gradual increase in area of the bright spot or cluster.

In one of the possible embodiments of this invention, such steady growth can be estimated by linear approximation. The slope of the linear approximation and the quality of such approximation (least squares) is used to accept or reject the area to be related to smoke-induced diffusion (i.e., the calculation of the temporal change in the size of the bitmap area, that is associated with those pixels that are identified as corresponding to the light source, is approximated by an assumed linear trend in the size change over a prescribed period of time and the magnitude of the rate of this assumed linear trend being above a prescribed value is used to identify the presence of smoke in the monitored area).

In another preferred embodiment, the polynomial approximation is used to interpolate the trends in the area of such clusters. In yet another preferred embodiment, the trained neural network can be used to determine whether the area of the bright spot cluster evolves in the way consistent with the presence of smoke.

Diversification of the Spot's Brightness Values

It has been observed that the diversity of the brightness values within the area of cluster of the light source is usually very limited. This phenomenon is caused by the fact that pixels within the bright spots are within the saturation limits of the television camera which in turn is a result of function of the Automatic Gain Control (AGC) circuitry of the camera that is designed to keep a certain average level of brightness across the whole image.

Figure 4A:
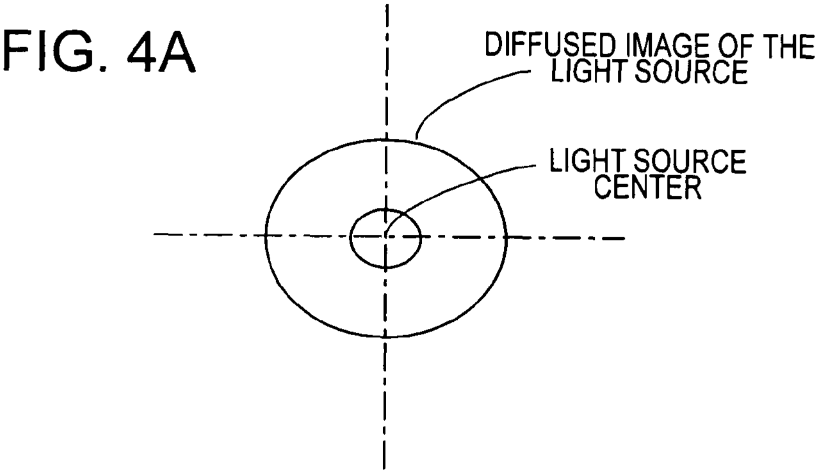
FIG. 4A illustrates the diffused image of a light source captured by an embodiment of the present invention.
Figure 4B:
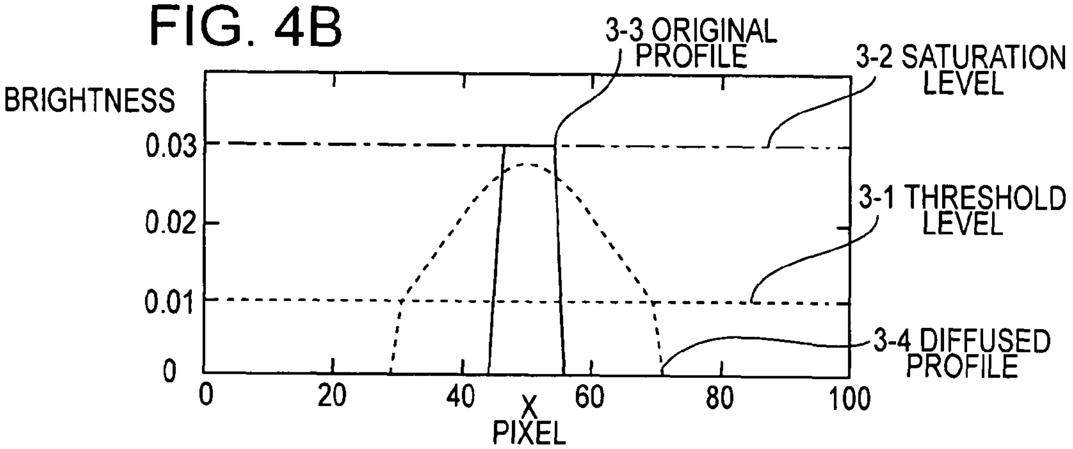
FIG. 4B illustrates how the brightness values over the image of FIG. 4A vary at different points within the image, especially when such an image is being influenced by the presence of smoke between the light source and the capture which captures such an image; see profile denoted as 3-4.
Figure 4C:
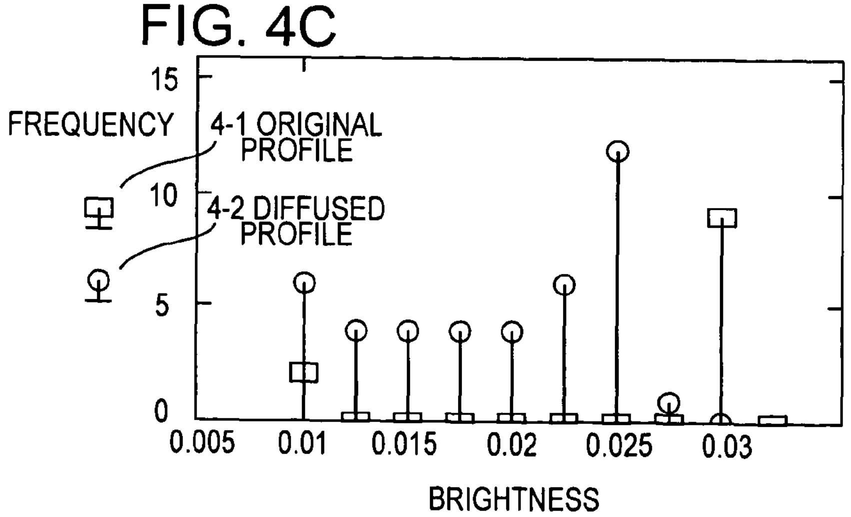
FIG. 4C compares two histograms which illustrate the frequency at which various brightness values are observed in the images illustrated in FIG. 4B: a histogram of the original light source and a histogram for this light source when smoke is present between the light source and a capture which is capturing its image.

FIG. 4B contrasts two brightness profiles, the typical brightness profile (3-3) across the image of the light source in the reference case when no smoke is present in the light's path to diffuse the light's transmission, and the smoke-induced profile (3-4) when smoke and diffusion are present. A bright spot cluster is formed when the brightness values exceed a specified threshold (3-1). Such video signals are also limited by the dynamic range of the camera that determines the upper limit of saturation (3-2).

Thus the undiffused light source forms near rectangular profile (3-3) while the diffused profile (3-4) forms the bell-shaped profile that may or may not be truncated by the upper limit of camera sensor saturation. The histogram of the relative brightness values is shown at (4). The distribution of the brightness values for undiffused source (4-1) has very limited variation of values leaving most slots of the histogram unpopulated. The histogram for diffused source (4-2) however is more evenly populated. The measure of the diversity in the brightness values within the bright spot cluster can be used to positively identify the effect of diffusion caused by the smoke. Thus, the calculation of the temporal change in the variation in the brightness levels of the pixels that are identified as corresponding to the light source utilizes the computation of the changes in the shape of the histograms of the brightness levels corresponding to the successive captured images.

In another preferred embodiment of the present invention, the presence of smoke in a monitored area is identified by changes in the Shannon entropy of the monitored signal (i.e., the calculation of the temporal change in the variation in the brightness levels of the light-source associated pixels utilizes the computation of the Shannon entropy for the pixels). Shannon entropy is defined as:

$$S = \sum_{i=1}^{N} -p_i \ln(p_i)$$

where $p_i$ is a probability of the brightness of the given value and N is a total number of different values. Thus, due to more populated probability values, a diffused light source exhibits higher Shannon entropy which indicates the presence of smoke in the monitored area.

In another preferred embodiment, direct pattern matching of the brightness value histograms generated within the diffused source can be used to identify the presence of smoke. The possible techniques to be employed to identify smoke-induced anomalies include, but are not limited to neural networks and fuzzy logic.

As a means of reducing the rate of false alarms that may be caused by moving and advancing light sources, the evolution of other geometric properties of a light source can be monitored.

For example, the basic shape properties of a light source, such as its aspect ratio (height to width ratio) is monitored to ensure that it does not exceed a prescribed range. In another preferred embodiment, the motion of a light source is monitored to determine if the initial footprint of the source remains within the footprints of the subsequent views of the source.

As yet another additional means of reducing the rate of false alarms, especially those due spurious changes in light source intensity, the maximum brightness of each cluster is monitored and those clusters that show significant increase in maximum brightness are rejected as nuisances.

Although the foregoing disclosure relates to preferred embodiments of the present invention, it is understood that these details have been given for the purposes of clarification only. Various changes and modifications of the invention will be apparent, to one having ordinary skill in the art, without departing from the spirit and scope of the invention as hereinafter set forth in the claims.

I claim:

1. A method of detecting smoke in a monitored area containing a light source, said method comprising the steps of:

capturing, at a point in said monitored area that is distant from said light source at a prescribed frequency, a sequence of two-dimensional, pixel bitmaps of the video images of said light source;

storing said sequence of two-dimensional, pixel bitmaps;

extracting from said stored sequence of bitmaps those pixels that make up a bright spot area within each of said bitmaps that is due to the presence of said light source in said monitored area, wherein said extractions yield a sequential collection of bright spot areas having characteristics including a distribution of different brightness values observed across the spatial extent of said bright spot areas; and identifying an increase in diversity of the different brightness values observed across the spacial extent of said bright spot areas, based on said sequential collection, as being indicative of the presence of smoke in said monitored area acting to diffuse the light from said light source.

2. The method of smoke detection as recited in claim 1, wherein said extraction of those pixels that make up said bright spot areas involves selecting those pixels whose brightness values exceed a prescribed threshold value.

3. The method of smoke detection as recited in claim 1, wherein: the increase in diversity of the different brightness values is determined by changes in the Shannon entropy for those pixels that comprise said bright spot areas.

4. The method of smoke detection as recited in claim 1, further comprising the step of: in the event that said presence of smoke in said monitored area is identified, signaling the detection of said monitored area.

5. The method of smoke detection as recited in claim 1, wherein an increase in diversity of the different brightness values is determined by identifying an increase in the quantity of different brightness values measured for the pixels within said bright spot areas.

* * * * *